(12) United States Patent
Maximov et al.

(10) Patent No.: US 10,972,284 B2
(45) Date of Patent: **\*Apr. 6, 2021**

(54) METHOD OF PROVIDING A HASH VALUE FOR A PIECE OF DATA, ELECTRONIC DEVICE AND COMPUTER PROGRAM

(71) Applicant: Telefonaktiebolaget LM Ericsson (publ), Stockholm (SE)

(72) Inventors: Alexander Maximov, Lund (SE); Martin Hell, Malmo (SE); Bernard Smeets, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,926

(22) Filed: Aug. 13, 2019

(65) Prior Publication Data
US 2019/0372774 A1    Dec. 5, 2019

Related U.S. Application Data (63) Continuation of application No. 15/310,756, filed as application No. PCT/EP2016/050857 on Jan. 18, 2016, now Pat. No. 10,396,995.

(Continued)

(51) Int. Cl.
*H04L 29/06* (2006.01)
*H04L 9/32* (2006.01)
(Continued)

(52) U.S. Cl.
CPC ........... *H04L 9/3242* (2013.01); *G06F 21/64* (2013.01); *H04L 9/006* (2013.01); *H04L 9/321* (2013.01);
(Continued)

(58) Field of Classification Search
CPC .................................................. H04L 9/3242
See application file for complete search history.

(56) References Cited

U.S. PATENT DOCUMENTS 6,097,811 A    8/2000  Micali
6,397,329 B1   5/2002  Aiello et al.
(Continued)

FOREIGN PATENT DOCUMENTS

CN   1319290 A    10/2001
CN   101534196 A   9/2009
(Continued)

OTHER PUBLICATIONS

Chinese Office Action dated Mar. 16, 2020 in connection with Chinese Application No. 201680011146.3, 7 pages.
(Continued)

*Primary Examiner* — Shawnchoy Rahman
(74) *Attorney, Agent, or Firm* — Leffler Intellectual Property Law, PLLC (57) ABSTRACT

A method of providing a hash value for a piece of data is disclosed, where the hash value provides for a time-stamp for the piece of data upon verification, for limiting a risk of collisions between hash values. The method comprises collecting one or more root time-stamps for a root of a hash tree structure defining a hash function, wherein the root-time stamp is a root time-stamp from the past, determining whether a nonce may be received from a server, and upon failure to receive the nonce from the server, providing the hash value by a hash function of the root time-stamp and the piece of data, or upon success in receiving the nonce from the server, providing the hash value by the hash function of the root time-stamp, the piece of data and the nonce. An electronic device and a computer program are also disclosed.

9 Claims, 7 Drawing Sheets

US 10,972,284 B2

Page 2

Related U.S. Application Data (60) Provisional application No. 62/118,973, filed on Feb. 20, 2015.

(51) Int. Cl.
*H04L 9/00* (2006.01)
*G06F 21/64* (2013.01)

(52) U.S. Cl.
CPC .......... H04L 9/3268 (2013.01); H04L 9/3297 (2013.01); *H04L 2209/38* (2013.01); *H04L 2209/76* (2013.01)

(56) References Cited

U.S. PATENT DOCUMENTS

| | | | |
|---|---|---|---|
| 7,068,254 B2 | 6/2006 | Yamazaki et al. | |
| 7,340,610 B1 | 3/2008 | Yagawa | |
| 8,086,842 B2 | 12/2011 | Sidhu et al. | |
| 9,614,682 B2 | 4/2017 | Buldas et al. | |
| 9,698,993 B2 | 7/2017 | Zaverucha et al. | |
| 2002/0184504 A1 | 12/2002 | Hughes | |
| 2002/0194484 A1 | 12/2002 | Bolosky et al. | |
| 2003/0078058 A1 | 4/2003 | Vatanen et al. | |
| 2004/0049675 A1 | 3/2004 | Micali et al. | |
| 2007/0214363 A1 | 9/2007 | Ishii | |
| 2008/0095360 A1 | 4/2008 | Vuillaume et al. | |
| 2008/0211624 A1 | 9/2008 | Micali et al. | |
| 2009/0164783 A1 | 6/2009 | Solis et al. | |
| 2009/0199010 A1 | 8/2009 | Hakuta et al. | |
| 2009/0235349 A1 | 9/2009 | Lai et al. | |
| 2010/0110935 A1* | 5/2010 | Tamassia ............ | H04L 67/1065 370/256 |
| 2010/0268943 A1 | 10/2010 | Roy-Chowdhury et al. | |
| 2012/0046110 A1 | 2/2012 | Amaitis et al. | |
| 2012/0239935 A1 | 9/2012 | Osborne et al. | |
| 2012/0324229 A1 | 12/2012 | Buldas et al. | |
| 2013/0163412 A1 | 6/2013 | Hughes et al. | |
| 2014/0108817 A1 | 4/2014 | Chen et al. | |
| 2014/0198791 A1 | 7/2014 | Lim | |
| 2014/0245020 A1 | 8/2014 | Buldas et al. | |
| 2015/0052615 A1 | 2/2015 | Gault et al. | |
| 2015/0222619 A1 | 8/2015 | Hughes et al. | |
| 2015/0365242 A1* | 12/2015 | Gault .................... | H04L 9/3265 713/178 |
| 2016/0028552 A1 | 1/2016 | Spanos et al. | |
| 2018/0013567 A1 | 1/2018 | Davis | |
| 2018/0205552 A1 | 7/2018 | Struttmann et al. | |

FOREIGN PATENT DOCUMENTS

| | | |
|---|---|---|
| EP | 1912376 A1 | 4/2008 |
| JP | 2007028015 A | 2/2007 |
| JP | 2011205234 A | 10/2011 |
| TW | 201123802 A | 7/2011 |
| WO | 0011828 A1 | 3/2000 |
| WO | 2006124894 A2 | 11/2006 |
| WO | 2014127904 A1 | 8/2014 |
| WO | 2015155368 A1 | 10/2015 |

OTHER PUBLICATIONS

Chinese Search Report dated Mar. 11, 2020 in connection with Chinese Application No. 201680011146.3, 3 pages.
English language translation Summary of Chinese Office Action dated Mar. 16, 2020 in connection with Chinese Application No. 201680011146.3, 3 pages.
WO Patent Application Publication No. 2015155368 A1 published Oct. 15, 2015.
PCT International Search Report, dated Apr. 8, 2016, in connection with International Application No. PCT/EP2016/050857, all pages.
PCT Written Opinion, dated Apr. 8, 2016, in connection with International Application No. PCT/EP2016/050857, all pages.
Ahto Buldas et al., Optimally Efficient Accountable Time-Stamping, Mar. 23, 2004, Public Key Cryptography; Lecture Notes in Computer Science, Springer-Verlag, Berlin/Heidelberg, pp. 293-305.
Yih-Chun Hu et al., Efficient Constructions for One-Way Hash Chains, In: Correct System Design, Jan. 1, 2005, Springer International Publishing, vol. 3531, pp. 423-441.
Ahto Buldas et al., Efficient Quantum-Immune Keyless Signatures with Identity, International Association for Cryptologic Research, May 6, 2014, pp. 1-14.
H. Krawczyk et al, Feb. 1997, HMAC: Keyed-Hashing for Message Authentication; Network Working Group; Request for Comments: 2104; Category: Informational; 10 pages.
Quan Son Nguyen, Multi-Dimensional Hash Chains and Application to Micropayment Schemes, arXiv:cs/0503060v1 [cs.CR] Mar. 23, 2005, pp. 1-9.
Erik Dahmen et al., Short Hash-Based Signatures for Wireless Sensor Networks, Cryptology and Network Security, Springer Berlin Heidelberg, Dec. 12, 2009, pp. 463-476.
Josh Benaloh et al., One-Way Accumulators: A Decentralized Alternative to Digital Signatures, Advances in Cryptology Eurocrypt 93, Springer Berlin Heidelberg, May 23, 1993, pp. 274-285.
Nobutaka Kawaguchi et al., Efficient log authentication for Forensic Computing, Proceedings of the 2005 IEEE, Workshop on Information Assurance and Security, United States Military Academy, West Point, NY, pp. 215-223.
Duc-Phong Le et al., Signtiming Scheme based on Aggregate Signatures, ISI 2008, Jun. 17-20, 2008, Taipei, Taiwan, pp. 145-149.
Wei Guo et al., Study on the Security of Time-Stamping Service Architecture, 2009 International Conference on Electronic Commerce and Business Intelligence, pp. 28-32.
Ahto Buldas et al., Security Proofs for Hash Tree Time-Stamping Using Hash Functions with small Output Size, ACISP 2013, LNCS 7959, pp. 235-250.
PCT International Search Report dated Apr. 8, 2016 in connection with International Application No. PCT/EP2016/050297, all pages.
Written Opinion dated Apr. 8, 2016 in connection with International Application No. PCT/EP2016/050297, all pages.
PCT International Search Report dated Apr. 11, 2016 in connection with International Application No. PCT/EP2016/050860, all pages.
Written Opinion dated Apr. 11, 2016 in connection with International Application No. PCT/EP2016/050860, all pages.
PCT International Search Report dated Apr. 11, 2016 in connection with International Application No. PCT/EP2016/050861, all pages.
Written Opinion dated Apr. 11, 2016 in connection with International Application No. PCT/EP2016/050861, all pages.
PCT International Search Report dated Apr. 13, 2016 in connection with International Application No. PCT/EP2016/050858, all pages.
Written Opinion dated Apr. 13, 2016 in connection with International Application No. PCT/EP2016/050858, all pages.
Non-Final Office Action dated Jun. 25, 2018 in connection with U.S. Appl. No. 15/312,651, 50 pages.
Non-Final Office Action dated Jun. 29, 2018 in connection with U.S. Appl. No. 15/312,661, 59 pages.
"Message authentication code", https://web.archive.org/web/20120620150708/https://en.wikipedia.org/wiki/Message_authentication_code, Jun. 6, 2018, Wikipedia, pp. 1-2 (Year:2012).
Non-Final Office Action dated Aug. 8, 2018 in connection with U.S. Appl. No. 15/312,639, 48 pages.
Non-Final Office Action dated Aug. 7, 2018 in connection with U.S. Appl. No. 15/312,624, 38 pages.
"Message authentication code", https://web.archive.org/web/20111224220942/http://en.wikipedia.org:80/wiki/Message_Authentication_Code, Dec. 24, 2011, Wikipedia, 7 pages (Year: 2011).
PCT International Search Report, dated Dec. 16, 2015, in connection with International Application No. PCT/EP2015/057900, all pages.
PCT Written Opinion, dated Dec. 16, 2015, in connection with International Application No. PCT/EP2015/057900, all pages.
Markus Jakobsson et al., Fractal Merkle Tree Representation and Traversal, Grid and cooperative computing—GCC 2004, third international conference, Wuhan, China, Oct. 21-24, 2004, pp. 314-326.

(56) References Cited

OTHER PUBLICATIONS

Non-Final Office Action dated Mar. 24, 2017 in connection with U.S. Appl. No. 14/443,779, 23 pages.
Non-Final Office Action dated Aug. 16, 2018 in connection with U.S. Appl. No. 16/030,207, 22 pages.
Notice of Allowance dated Apr. 16, 2019 in connection with U.S. Appl. No. 16/030,207, 17 pages.
Danny De Cock, Belgian eID Card Technicalities, Jun. 21, 2005, 34 pages.
Erik Dahmen et al., Short Flash-Based Signatures for Wireless Sensor Networks, Cryptology and Network Security, Springer Berlin Heidelberg, Dec. 12, 2009, pp. 463-476.
Ahto Buldas et al., Keyless Signatures' Infrastructure: How to Build Global Distributed Flash-Trees, Dec. 16, 2013, pp. 1-9.
Ahto Buldas et al., Efficient Implementation of Keyless Signatures with Hash Sequence Authentication, Sep. 4, 2014, pp. 1-13.
Ahto Buldas et al., Security Proofs for the BLT Signature Scheme, Sep. 4, 2014, pp. 1-22.
Ahto Buldas et al., Knowledge-Binding Commitments with Applications in Time-Stamping (Full Version), Feb. 28, 2007, pp. 1-17.
Merkle Tree, from Wikipedia, the free encyclopedia, captured Feb. 19, 2015, 3 pages.
Don Coppersmith et al., Almost Optimal Hash Sequence Traversal, Feb. 25, 2002, pp. 1-16.
Ahto Buldas et al., Keyless Signatures' Infrastructure: How to Build Global Distributed Hash-Trees, Correct System Design, Lecture Notes in Computer Science, Springer International Publishing, Cham, approximately Dec. 16, 2013, pp. 313-320.

* cited by examiner

METHOD OF PROVIDING A HASH VALUE FOR A PIECE OF DATA, ELECTRONIC DEVICE AND COMPUTER PROGRAM

CROSS-REFERENCE TO RELATED APPLICATIONS

This application claims the benefit of U.S. application Ser. No. 15/310,756 filed Nov. 12, 2016 (371(c) date), which is a 35 U.S.C. § 371 national stage of international application PCT/EP2016/050857 filed Jan. 18, 2016, which claims the benefit of U.S. Provisional Application No. 62/118,973 filed Feb. 20, 2015. All of these earlier applications are hereby incorporated herein by reference in their entireties.

TECHNICAL FIELD

The present invention generally relates to a method of providing a hash value for a piece of data, where the hash value provides for a time-stamp for the piece of data upon verification. The method aims at limiting a risk of collisions between hash values. The present invention further relates to an electronic device performing the method, and a computer program for implementing the method.

BACKGROUND

"Big data", cloud, and the Internet of Things (IoT) are examples of the rapidly expanding area of distributed data networks and acquisition of distributed data. Data generated at a plurality of source nodes is collected for processing and/or analysis. An example of the source nodes includes sensor networks that perform measurements and provide measurement data, e.g., in home automation data networks or industrial processing data networks. A further example includes servers in a data center generating event log records, e.g. for operational security.

The operation of data networks, such as above examples, relies upon the integrity of the data received from the distributed data sources and the control processes. This means that as data is collected, it has to be possible to verify that the data has not been tampered with since the data left the source node. Furthermore, the data source has to be authentic. This means that an indicated source, e.g., a source node indicated by the received data or a data packet including the data, is the actual originator of the data.

Depending on operational security requirements, it is not sufficient that only the intended recipient collecting the data can verify aspects of integrity and authenticity. Rather, it is required that third parties can audit the data exchange between the source nodes and the collecting node. Conventional techniques for authenticating the data source implement public-key cryptography, e.g., using a Public Key Infrastructure (PKI) with signatures on all data exchanged between the nodes.

However, generating signatures is resource consuming in minimalistic source nodes (also referred to as "low-end devices") such as sensors. Furthermore, the impact of signatures on bandwidth and/or storage is disproportionally large compared to the data to be exchanged (e.g., since the nodes have to be prepared for an audit, a large number of signatures have to be stored for relatively long time periods in the nodes). Moreover, signatures verifiable by a PKI are known to be cumbersome to establish and maintain over time, especially if many sources of data have to be distinguished, i.e., identified by means of different certificates.

Other conventional techniques, e.g. below referred to as QI-KSI, implement Merkle trees. Aggregating hash values of the exchanged data in a Merkle tree is efficient, since the "root" of the Merkle tree provides a compressed digest of all individual hash values, so that the Merkle tree reduces storage requirements. However considerable effort is needed to arrange for the keys in each leaf of the tree to be used for authentication.

Ahto Buldas, Andres Kroonmaa and Risto Laanoja have disclosed some principles in "Keyless Signatures' Infrastructure: How to Build Global Distributed Hash-Trees", below referred to as [1], in "Efficient Quantum-Immune Keyless Signatures with Identity", below referred to as [2], in "Efficient Implementation of Keyless Signatures with Hash Sequence Authentication", below referred to as [3], and in "Security Proofs for the BLT Signature Scheme", below referred to as [4]. Ahto Buldas and Sven Laur have disclosed some principles in "Knowledge-Binding Commitments with Applications in Time-Stamping", below referred to as [5].

It is a desire to provide a practical implementation for providing time-stamping which still provides a fair degree of certainty.

SUMMARY

The invention is based on the understanding that time stamping using a hash function may be tampered by intentional collision, i.e. the hash result of a tampered time stamp is made to collide with a correct time stamp. The inventors have found that this way of tampering a time stamp may be limited by using "fresh" input values for the time stamping, i.e. values that cannot be known a long time in advance of the time stamping operation, thereby making it hard to provide an intentional collision.

According to a first aspect, there is provided a method of providing a hash value for a piece of data, where the hash value provides for a time-stamp for the piece of data upon verification, for limiting a risk of collisions between hash values. The method comprises collecting one or more root time-stamps for a root of a hash tree structure defining a hash function, wherein the root-time stamp is a root time-stamp from the past, determining whether a nonce may be received from a server, and upon failure to receive the nonce from the server, providing the hash value by a hash function of the root time-stamp and the piece of data, or upon success in receiving the nonce from the server, providing the hash value by the hash function of the root time-stamp, the piece of data and the nonce.

The root time-stamp may be a calendar root hash.

The hash function may be a cryptographic message authentication code function. The cryptographic message authentication code function may be a keyed-hash cryptographic message authentication code function using at least one of the nonce, upon success in receiving the nonce from the server, and the root time-stamp as a key.

The root time-stamp from the past may comprise one or more root hash values wherein the oldest one of the root hash values emanates from a root hash that is issued at most a time T before the provision of the hash value for the piece of data. The time T may depend on the size of the piece of data such that a smaller amount of data is given less time back than a larger amount of data.

The method may comprise registering the provided hash value.

According to a second aspect, there is provided an electronic device comprising a processor arranged to implement a functional module for limiting a risk of collisions between hash values, wherein the functional module is arranged to perform the method according to the first aspect.

The electronic device may be a wireless device.

The electronic device may be a network node.

According to a third aspect, there is provided a computer program comprising instructions which, when executed on a processor of an electronic device, causes the electronic device to perform the method according to the first aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Certain embodiments disclosed herein relate generally to the technical field of security, and more particularly to the field of hash functions. For the easier understanding of the contribution by the invention, an introduction to mechanisms for providing hash functions used for time stamping is demonstrated below. For further facilitating the reading of this disclosure, commonly used abbreviations are listed below.

ABBREVIATIONS

Abbreviation Explanation

BLT Extension of KSI
CRH Calendar root hash
GW Gateway
KSI Keyless Signature Infrastructure
HMAC specific message authentication code algorithm construction
MAC message authentication code algorithm (generic)
PKI Public Key Infrastructure
TSA Time-Stamp Authority
PKI Public Key Infrastructure
QI-KSI Quantum-Immune KSI, e.g. BLT
RH Root hash of a Merkle type of tree
HP Hash path of a Merkle type of tree
LRS Left-Right Sequence of a hash path
AHP Aggregation hash path
ARH Aggregation root hash
CHP Calendar hash path
CRH Calendar root hash
TTP Trusted third party
TTP-SA Trusted third party signing authority
CA Certificate Authority
SK Secret key
PK Public key
HC Hash chain
OTSK One time signing key
OTAK One time authentication key Introduction to KSI KSI stands for the "Keyless Signature Infrastructure. This section is based on open sources, such as publications of papers [1-5] mainly on the cryptographic e-print web-based database where the authors describe different aspects of the KSI. The term "keyless signature" that is used in references [1-5] could be seen as slightly misleading. Another term, in the field of cryptography, that could be used instead is a "time stamp" of a given hash value, from the client's perspective. For consistent terminology with earlier work, we will nevertheless stick with the term KSI in the text below.

Merkle Trees and Hash Paths

Figure 1:
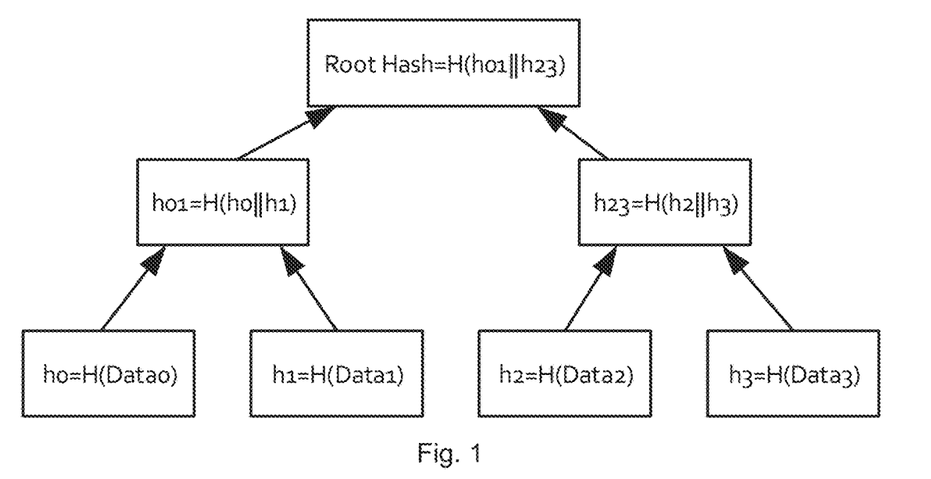
FIG. 1 illustrates a hash tree structure.

FIG. 1 illustrates a Merkle hash tree where H is a pre-defined hash function. The KSI is based on the well-known Merkle hash tree construction, a hash tree structure. The hash tree or Merkle tree is a tree in which every non-leaf node is labelled with the hash of the labels of its children nodes. Hash trees are useful because they allow efficient and secure verification of the contents of large data structures. Hash trees are a generalization of hash lists and hash chains. Demonstrating that a leaf node is a part of the given hash tree requires processing an amount of data proportional to the logarithm of the number of nodes of the tree; this contrasts with hash lists, where the amount is proportional to the number of nodes. FIG. 1 shows an example of such a tree with 4 leafs. The tree's leafs are digests of a pre-defined hash function H. The next layer includes two nodes with hash values $h_{01}$ and $h_{23}$ that are derived from the adjacent children leafs as the hash of the concatenation of the leafs' digests. The root hash (RH) is computed as the hash of the concatenation $h_{01} \| h_{23}$ (the order of the concatenation is important). This way, given the values on the tree's leafs one may compute the root hash that actually binds all the values of leafs together. I.e., changing any value in any leaf implies a change of the RH value.

Figure 2:
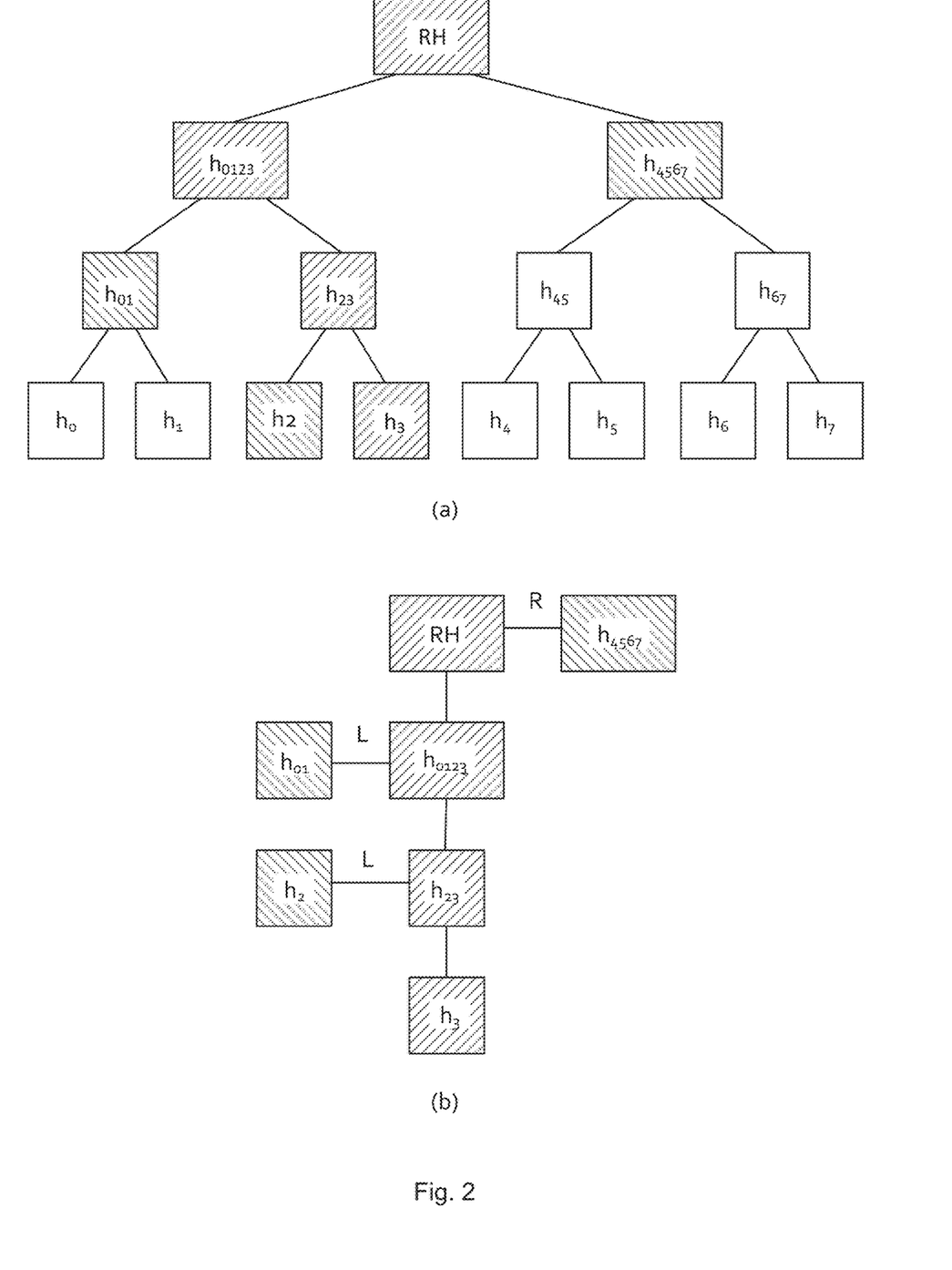
FIG. 2 illustrates a Merkle tree and a corresponding hash path.

Another notion that we will use is the Hash Path (HP), which is an ordered sequence of hash values that helps to derive the root hash, starting from a chosen leaf value. FIG. 2 shows an example of a Merkle tree with 8 leafs, as illustrated in FIG. 2a, and the corresponding hash path for the leaf $h_3$, as illustrated in FIG. 2b, that includes the sequence of "missing" nodes of the tree needed for the complete derivation of the RH. Note that the "missing" hash values in each node are added to the child's hash value either from the left (L) or from the right (R) side. The ordered sequence of "L" and "R" marks of a given HP is a left-right sequence (LRS) of a given HP.

Thus, the path can be written as the sequence of 4 hash values $\{h_3; h_2(L); h_{01}(L); h_{4567}(R)\}$, and having the sequence of "L-R" marks one can compute the root hash explicitly.

It is also worth to note that an LRS is 1-to-1 mapped to the index of the leaf, if the LRS is translated into the binary representation with the following rules: L-R marks closer to the root represent the most significant bits of the index, and closer to the leafs represent the least significant bits of the index; L is translated to the bit value 1 and R is translated to the bit value 0.

Indeed, in the example illustrated in FIG. 2b of the hash path for $h_3$ the L-R sequence is "RLL", and it is translated to the correct index $011_2=3$.

As a final comment we note that we actually can change the hash function as we move through the tree. In that case an identifier of the hash function used in each merging node has to be encoded into the path.

KSI Architecture

Figure 3:
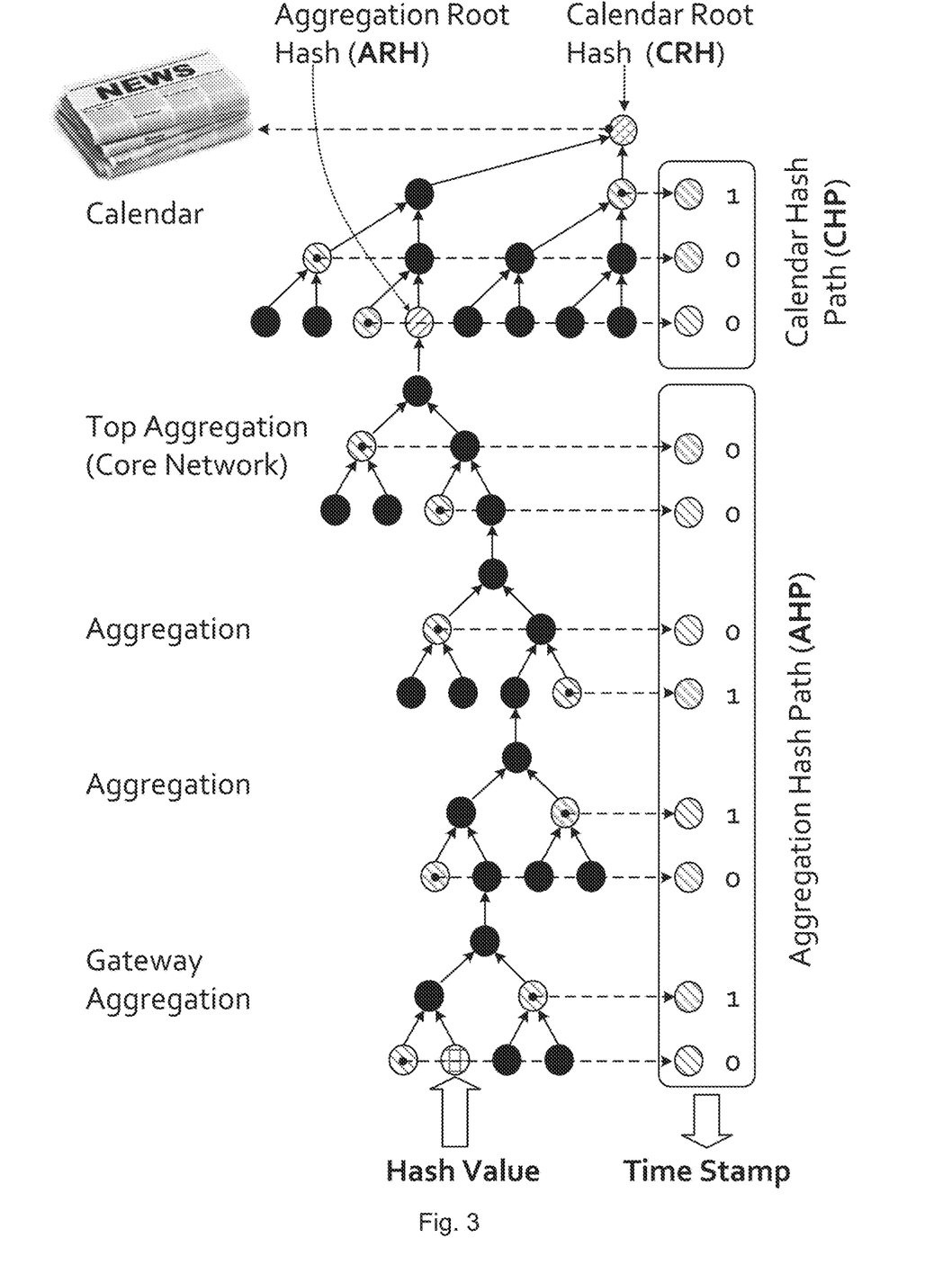
FIG. 3 schematically illustrates a KSI architecture.

A basic drawing of the KSI architecture is shown in FIG. 3. That is, FIG. 3 illustrates KSI's global Merkle tree and its layers. KSI makes it possible for many users to collectively insert their hash values into the distributed Merkle tree and to compute the collective root hash, at a given time slot.

The KSI system architecture includes several layers of aggregators, the functionality of each is basically to accept multiple hash values from the children connections, produce the local root hash, and push it to the upper layer for further aggregation. There are physically many aggregators on each layer that are distributed world-wide, but in the FIG. 3 there is only one hash path is shown, from the below single client to the top RH.

A client or a device may push its own hash value using t entry point called the Gateway. The Core Network (CN) is the last "station" of accumulating hash values into the large Merkle tree, and CN thus computes the aggregation root hash (ARH).

Additionally, CN has an extra modified Merkle tree to add the time stamping to ARH at a given time. The Calendar tree is organized such a way that it includes both the current ARH and the history of all previous ARHs in the past. The result of the Calendar tree is the Calendar Root Hash (CRH).

As the result of aggregation, the client receives back the aggregation hash path (AHP) from the client's hash value to the aggregation root hash, and also the calendar hash path (CHP) from the ARH to the global time stamp hash value that is actually the CRH.

The Core Network beats at regular intervals, for example, say once per second, which means that the CRH and the calendar tree are updated every second. CN also keeps the history of the global time-stamps for each second slot—the combination of ARHs and all historical CRHs in the past.

This way, the client or anyone else can later verify that the combination of a saved aggregation hash path and the calendar hash path at a certain time t lead to the correct value. I.e., LRS of AHP could be served as a static identifier of the Gateway (if the connection of the Gateway to the KSI infrastructure is static), and LRS of CHP is used to verify the time when the hash paths were created.

The global time stamp value CRH can be periodically published in a newspaper so that the Core Network cannot itself to modify the global time stamp back in time.

For verification purposes, the CRH can be received either off-line, or on-line. For off-line use cases one could take the CRH through the printed publications (that may be periodically once per month). For on-line verification use cases, the CRH can be signed by a trusted entity (perhaps, including a certificate), and then it can be downloaded by clients and/or applications at any time for verification purposes.

In the general architecture of KSI the entry point for clients (and/or applications) is the Gateway (GW) that itself can be an aggregation layer, but additionally provides the client's front-end for various services based on KSI's time-stamping infrastructure. This way, the Gateway can be seen as a server-based service engine that should be located close to the customer, or actually be on the customer's side.

The list of possible services that the Gateway may assist with includes: time-stamping of a given hash value, assistance in signing a document, etc. All those services are not really a part of KSI, but some of them are a part of QI-KSI.

Figure 4:
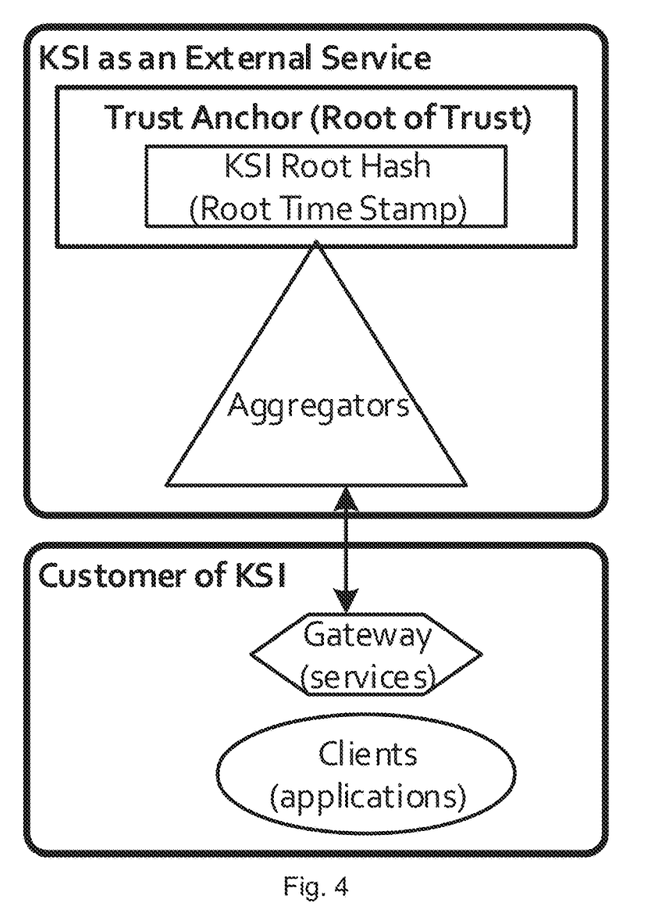
FIG. 4 illustrates a simplified view of the KSI architecture.

FIG. 4 illustrates a simplified view of KSI structure, and we may now refer the simplified FIG. 4 of the KSI architecture.

Identifier vs Identity

KSI returns the aggregation hash path and the calendar hash path. The AHP may be considered as the identifier of the Gateway, since the L-R sequence in the global Merkle tree determines the way the Gateway was connected to the KSI. However, this identifier may be valid if certain conditions are valid:

(a) The logical connection of the Gateway to KSI's leaf is static (b) A certificate that binds the Gateway's identity with the identifier is issued.

Later we will see how the identifier is used in the QI-KSI signing model.

Introduction to QI-KSI

QI-KSI stands for "Quantum-Immune KSI". This section is mainly based on the papers [2] and [4] identified in the introductory part of this disclosure.

QI-KSI is an extension for KSI and provides two hash-based techniques. Hash-based cryptography is, as of today, believed to be quantum immune, so this is the reason for the name "quantum-immune". QI-KSI proposes the technique for a hash-based authentication, and a hash-based digital signature architecture with the help of KSI's time-stamping service.

Hash Chains for Authentication

This is based on one-time passwords techniques. The client (and/or application) selects a random secret value $z_n$ (of size of the hash digest), and generates the hash chain (HC) $z_0 \leftarrow z_1 \leftarrow \ldots \leftarrow z_n$ as follows:

$z_i = H(z_{i-1})$, for $i = 0 \ldots n-1$, and H is a chosen hash function.

The value $z_0$ is then shared with the server side (via some channel) to which the client is intended to authenticate himself.

At any given time, the server holds a value $z_k$ (in the beginning, the server holds the value $z_4$). When the client wants to authenticate himself, he uses and sends to the server the value $z_{k+1}$. The server verifies that $H(z_{k+1})=z_k$ and if the values coincide then the authentication is successful. In the latter case, the server throws away $z_k$ and holds $z_{k+1}$, instead, for future authentications.

This way, one secret key $z_n$ can be served for n authentications.

Hash Sequence Traversal Technique

In this scheme, every time the client wants to authenticate himself, the value $z_k$ needs to be recomputed from $z_n$. This may be a problem if n is large and there is no capacity to store or re-compute the whole hash chain. The solution to this problem is the technique called "hash sequence traversal". Such a technique was proposed by D. Coppersmith and M. Jakobsson in "HMAC: Keyed-Hashing for Message Authentication", IETF, RFC2104. In order to derive $z_k$ faster than just sequential hashing from $z_n$ to $z_k$, the reversed order of hash chain $z_0 \leftarrow z_1 \leftarrow \ldots \leftarrow z_k \leftarrow \ldots$ can be derived in average log(n) time if one could keep log(n) of intermediate hash values of the hash sequence. A short description of the M. Jakobsson and D. Coppersmith technique on the intuitive level can he given as follows. Assume the client can keep the value $z_{n/2}$, then the derivation of any value $z_k$ would require at most n/2 hashes, instead of n. Now let us assume that the client keeps two intermediate values $z_{n/2}$ and $z_{n1/4}$. Thus, the elements of the first half of the hash chain $z_k$, for $k \leq n/2$, would require re-computation of at most n/4 hashes. When k becomes larger than n/2, the intermediate value $z_{n1/4}$ can be removed and a new value $z_{n3/4}$ is derived linearly in time n1/4 hash operations, so that the elements of the second half of the hash chain $z_k$, for k>n/2, can be calculated in at most n/4 hashes as well. It has been shown that having log(n) intermediate hash values, the total time to derive the reverse-order hash chain is log(n), in average.

QI-KSI Signing Model

Figure 5:
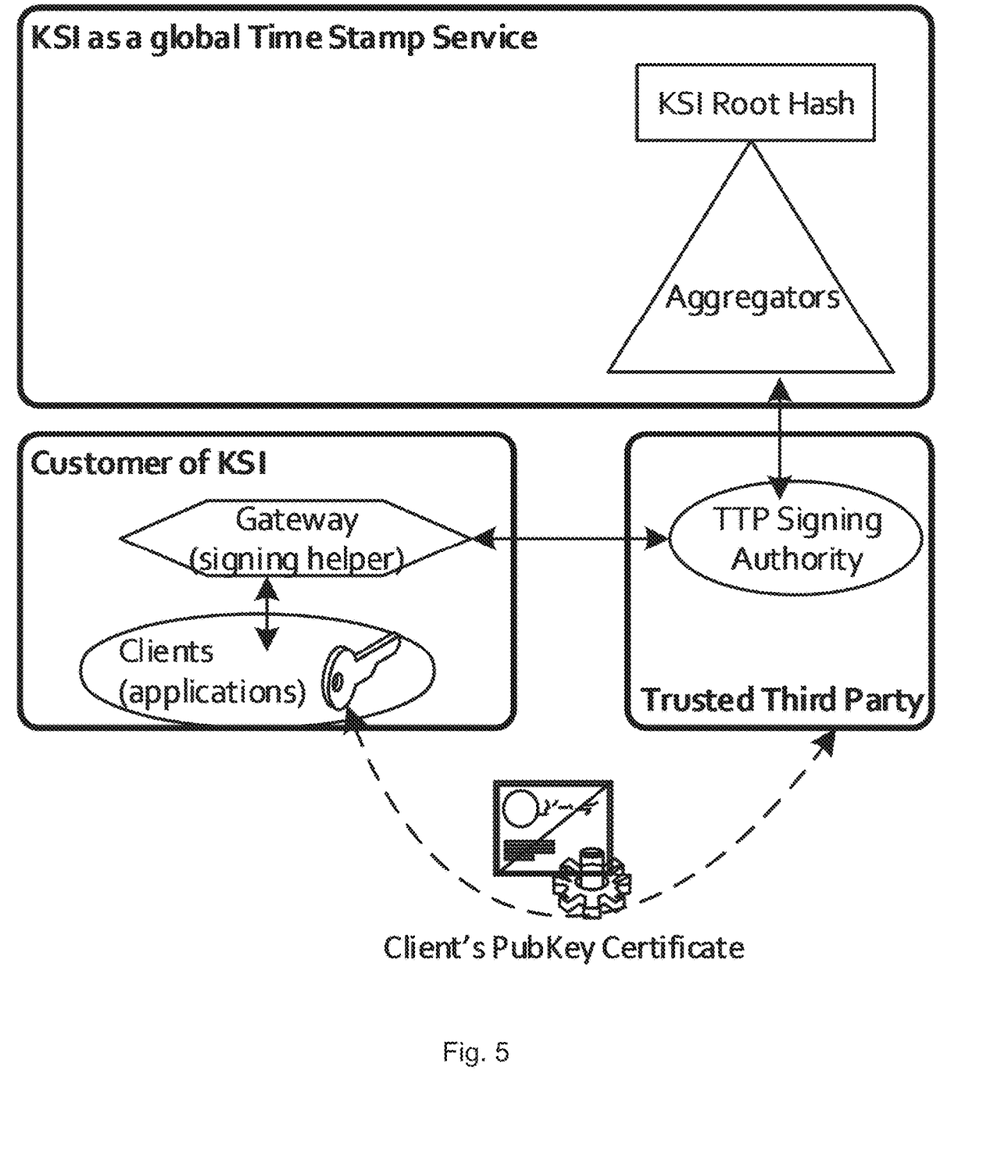
FIG. 5 illustrates a model of signing documents in QI-KSI.

The model of signing documents in QI-KSI is showed in FIG. 5. The client (or the Gateway, if the signing key is delegated), needs to create a secret signing key, and get a certificate from a CA on the public key. In this model, we look on the solution where a Trusted Third Party (TTP) behaves as a Signing Authority (TTP-SA) and takes part of the signing process and performs time-stamping of client's signing requests.

In QI-KSI, the signer first creates his own pair of the secret key and the public key. The signer chooses a random secret key $z_n$. Then, the sequence of values (hash chain) $z_0 \leftarrow \ldots \leftarrow z_n$ is computed as $z_i = H(z_i+1)$ for i=0 . . . n−1, and H is a chosen hash function.

The value $z_0$ is the public key and a relevant certificate for the public key $z_0$ is generated by an external certificate authority (CA). The value $z_0$ is bound with the user's identity in the validity time $t_0$ seconds from a well-known date (number of seconds from the date Jan. 1, 1970 and time 00:00:00) that determines the time after which the certificate is valid. To be more precise, a certificate should include at least the following fields: Cert:={Client's identity records; $z_0$, $t_0$, TTP-SA's identity and identifier}, where the TTP-SA's identifier can be the index of the leaf in the global KSI Merkle tree to which the TTP-SA is statically attached.

QI-KSI signing key looks similar to the hash chain in the QI-KSI authentication method, but the difference comes from the meaning of the index k in the notation $z_k$. The values $z_k$, k=1 . . . n, are used as one-time signing keys (OTSK) each of which can be used only at a certain KSI's time frame that is exactly $(t_0+k)$th second from the global starting time (recall, the Core Network "beats" and produces global time stamp values with the speed once per second).

QI-KSI Signing Protocol

Figure 6:
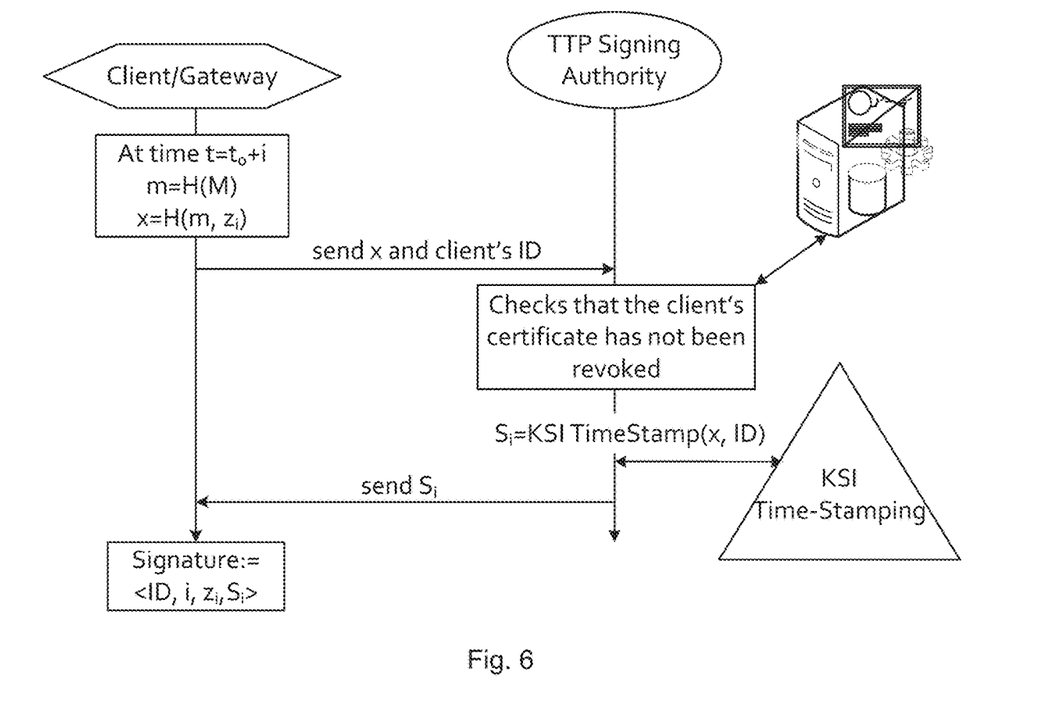
FIG. 6 illustrates a QI-KSI signing protocol.

QI-KSI signing protocol, see e.g. paper [2], is shown in FIG. 6. If the client wants to sign a piece of data, e.g. some message M, at a certain time slot t>$t_0$, such that t=$t_0$+i, then he takes the OTSK $z_i$ and computes x=H(H(M);$z_i$). The value of x together with the user's ID is sent to the TTP-SA. TTP-SA checks that the client's certificate has not been revoked. Then TTP-SA pushes the hash of x||ID to KSI in order to get the time stamping. The returned blob $S_i$ contains the identifier of TTP-SA, that is its static LRS of AHP, the hash path and the calendar path. CA sends $S_i$ back to the user. After the time-stamp is returned, and the current time t becomes larger than $t_0$+i seconds, the OTSK $z_i$ can be revealed. The signer then publishes the signature as <ID, i, $a_i$, $S_i$>.

The verifier may check that $z_i$ is actually the i:th pre-image of $z_0$, and the time stamp corresponds to $t_0$+i.

QI-KSI Improved OTSKs for Verification

Figure 7:
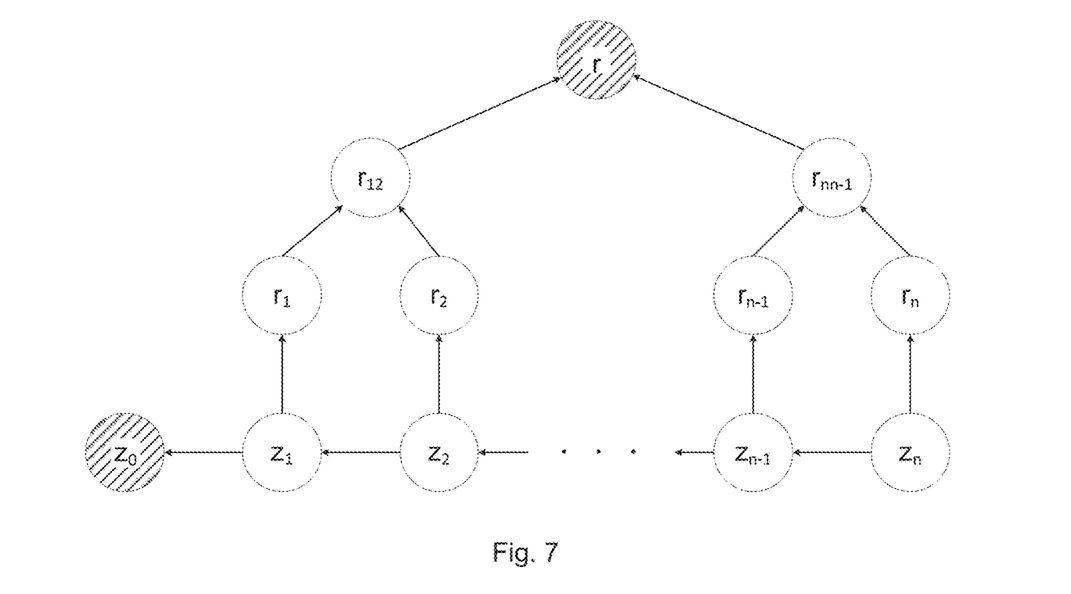
FIG. 7 illustrates modified OTSKs in a QI-KSI solution.

FIG. 7 illustrates modified OTSKs in a QI-KSI solution. In the QI-KSI signing protocol, the signer may derive the OTSK $z_i$ in log(n) time with the help of log(n) intermediate hash values using the hash sequence reversal technique, as it was described earlier.

The problem comes for the verifier who wants to check the signature, as he only knows $z_i$ but needs to verify it against the public key $z_0$. The verifier does not have those intermediate hash values and thus has to perform i hashes starting from $z_i$ and going all the way to $z_0$.

In order to reduce the time and/or complexity of the verification process, the following modification to OTSKs was proposed. This includes building yet another modified Merkle tree on top of OTSKs as shown in FIG. 7.

The client's certificate additionally includes the root hash r, and the signature additionally includes the hash path from the OTSK $z_i$ to the root r. Thus, the verifier only needs to check that $z_i$ participated in the hash root generation, and the L-R sequence of the hash path is translated to the correct index i.

For efficiency reasons, the signer needs to keep the relevant part of the hash-tree, and in the signing process the part of the hash tree that leads to the root hash r may be partly recomputed in log(n) time with log(n) intermediate hash values. That computation also requires the knowledge of other values in an efficient way, but then this part may be done with a hash chain traversal technique as demonstrated in U.S. provisional patent application No. 62/118,808.

Synchronization with KSI

It is important that $S_i$ returned by TTP-SA corresponds to the OTSK $z_i$ that has been used by the client. QI-KSI proposes the idea that the client actually needs to use 3 (or more) keys $z_i$, $z_{i+1}$ and $z_{i+2}$ and send a parallel request to TTP-SA for time-stamping. The signer will get 3 time stamps S's, but the stamp's time will correspond to only one of $z_i$ . . . $z_{i+2}$.

All this also means that the signer can produce one signature per 3 time i.e., one signature per 3 seconds.

The ability to find collisions is an undesirable effect mainly due to the fact that the signer has the possibility time-wise to do the computations needed to find a collision. The problem can be mitigated by reducing the time the signer has to perform his computations. Ideally the signer only gets the time needed to hash its data. Such solutions, like the one in Belgium Card ID eID, use a trusted time-stamping agent (TSA). Here, through an interaction with the TSA the hash is performed not until the TSA delivers the first time stamp. This may prevent the dishonest user to do the computations needed for finding a pair D and D' but it also means that it will limit the user in the amount of data he/she can honestly process. In addition in the context of KSI the time stamps are only issued at a given interval and the user hash only time stamps of already past time in form of the root hash values of the KSI hash tree. Hence the solution as of the eID of Belgium cannot be applied to KSI and one would like to avoid having restrictions on the amount of data that can be processed, even if some restrictions due to computational resources will be unavoidable.

An example of a case where a dishonest user would like to try to find a collision would be if a user would like to create two documents Dreal and Dfake where Hash(Dreal) would equal Hash(Dfake). Imagine the following scenario. A user creates a document Dreal and puts the value in the KSI hash tree. The user gets a timestamp back and now have a timestamp that matches the document. The user however has also created a document Dfake that is more beneficial for him. The user can now also match the timestamp to the Dfake document and claim that the Dfake document is the real one. The different documents might for example contain price information or other business agreements where the Dfake document is more beneficial to the user. In practice this can be done if the user has sufficient time, and have the possibility to manipulate both Dreal and Dfake in order to find a combination where both Dreal and Dfake looks convincing and useful and where they both generate the same hash value, meaning Hash(Dreal) equals Hash(Dfake).

According to certain embodiments, if a document is to be time-stamped in the hash tree that the user has to a) use at least one or more root time-stamps from the past and b) use at least a nonce that is given by the KSI GW in the process when submitting the hash of the document. By using proper choice of hash, or preferably MAC functions the user has no longer time to search for collisions. In particular embodiments, the hash computation is performed in a way that makes it extremely hard to find collisions due to the fact that a malicious user has essentially no time to perform the necessary computations. Hence when used in combination with a signing feature like in BLT this gives more secure digital signatures. This can for example prevent different kinds of fraud scenarios, like the one mentioned above. The verifier can also make a reasonable assumption that the signer started his hashing processing at a time reasonable for the length of the message.

Above, a possible context is described, in which embodiments disclosed herein can be beneficially employed. However, some embodiments disclosed herein can also be beneficially employed in other contexts. A number of embodiments are disclosed herein. Some embodiments are based on realizations that lead to a more efficient use of hardware resources, such as processors and/or memory, which in turn can result in reduced energy consumption and/or a reduction in required hardware.

Please note that when discussing hash functions below, in certain embodiments, the function Hash can be fed with data sequentially in the way that the leftmost parameter is processed first, and then the parameter to the right of the leftmost parameter, and so on. Thus, the order of the parameters may be important. The resulting function HT is however just a conceptual notation and here the order of the parameters may not be of importance.

In certain embodiments, if a document is to be time-stamped in the hash tree the application does not present the hash of the data D, but rather the result of a computation that the application cannot entirely do beforehand. The application takes a start time-stamp hash from the past and commences the hashing process. For example, a calendar root hash (CRH) may be used (other choices of non-predictable (from the application point of view) values available at the GW can be used). During the hash computations the application may or may not be required to add-in, at predetermined or randomized intervals, subsequent CRH values that also lie in the past in the hashing process, e.g.

$$HT(D,CRH)=\text{Hash}(\text{crh}(t1)\|D0\text{crh}(t2)\|D1\| \ldots \text{crh}(tk)\|D(n-1))$$

Where crh(tx) denotes the value of CRH at time tx and $t1 < t2 \ll \ldots < tk$. Further the data D can be divided into segments D0, D1, etc. where D0 is considered to be the first segment, and D1 the following, etc. This might be convenient when large log data files have to be hashed, as the application can start the hashing earlier. If an application tries to gain time by starting the process way back in time only for a small amount of data then a verifier seeing this might get suspicious. Therefore we henceforth assume that t1 is acceptably and sufficiently back in time, but not more, to allow the hashing to be performed.

Certain embodiments may achieve even better protection against collisions by forcing the user hash to depend on a random nonce r that the user will receive (e.g., from the server via the client software). For example, the API in the KSI solution may allow the user client to ask the server, running in the gateway GW, for a nonce.

$$HT(D,CRH,r)=\text{Hash}(\text{crh}(t1)\|D0\text{crh}(t2)\|D1\|\text{crh}(tk)\|D(n-1)\|r)$$

Hence the time between the delivery of r to the user and the user submitting HT(D, CRH, r)) is in microseconds. Note that compared to the TSA case described earlier this is more efficient as r may not need to be timestamped. In the TSA case it is a TSA signed data object, containing time, a random value and possibly other data, and thus is costly (time complex) to compute.

Now, for the sake of simplifying of further discussions, assume that we do not insert the intermediate time-stamps crh(t2), . . . crh(tn). Let us also denote s=crh (t1). In this case we can simply write $$HT(D,s,r)=\text{Hash}(s\|D\|r) \quad (1)$$

The above, when regarding s and the nonce r as a key, HT can be viewed as a keyed hash functions and hence could be seen as a cryptographic message authentication code (MAC) function. Security can thus be improved by using a MAC function with proven good properties like HMAC, [7]. But since HMAC is defined such that $$HMAC(D,r)=\text{Hash}(\text{Hash}((r \text{ XOR } \text{ipad})\|D)\|(r \text{ XOR } \text{opad}))$$

Where for a cryptographic Hash function where data is hashed by iterating a basic compression function on blocks (this block size is internal for the compression function and has nothing to do with either the size of the data D or with the size of the segments D0, D1, etc) of data of byte-length B.

ipad=the byte 0x36 repeated B times
opad=the byte 0x5C repeated B times.

The value of r has to be known at the start of the hashing procedure which is not the case, nor something that is desirable, in our setup. By redefining HMAC as $$HM(D,s,r)=\text{Hash}(\text{Hash}((s \text{ XOR } \text{ipad})\|D)\|(Z(s,r)\text{XOR opad})) \quad (2)$$

We can resolve this problem. Z(s,r) can be defined in various ways. A solution may be to have Z(s,r)=r. A solution that makes Z(s,r) depend on both s and r would the alternative, where one example could be to define Z as a stream of bits z[i], z[i+1], etc, where z[i] is defined according to:

if r[i] equals 0, then z[2i]=s[i], and z[2i+1]=r[i]
if r[i] equals 1, then z[2i]=r[i], and z[2i+1]=s[i]

Where i=0, . . . , m−1, m being the bit length of r and s. If the use of a modified HMAC is not possible for example due to existing hardware implementations, the following alternative could be used $$HT(D,s,r)=\text{HMAC}(D\|r,s) \quad (3)$$

Thus we see from equations (1-3) that an improved hashing is feasible that blocks collision searching using ordinary hash or MAC functions and previous root hash values. In our discussion we used CRH values as these are available at the GW. In cases were interaction with the GW is not possible to receive the nonce the submitted hash as defined by (3) becomes simply $$HT(D,s)=\text{HMAC}(D,s) \quad (4)$$

Note that instead of HMAC other MAC constructions can be used.

In certain embodiments, the time-stamps of the past are used in combination with a submit nonce to prevent that the user has time to perform a search for collisions. The user have basically no time to make multiple calculations in order to find two messages which when run through a hash function would generate the same hash code. In one embodiment, the user equipment may be based on a Data, calculate a hash value using as indata one or more pairs of an old calendar value Hcr(x) and a segment of data Dy, then register the hash value and receive a time stamp. In another embodiment, the user equipment may be based on a Data, calculate a hash value using as indata one or more pairs of an old calendar value Hcr(x) and a segment of data Dy, and a nonce obtained from the KSI gateway, then register the hash value and receive a time stamp.

In another embodiment, the different pieces of equipment holding the hash three structure will collectively process at predetermined intervals presented derived values of data to obtain a root hash values referred to as time-stamps that are published such that the presented hash values to be processed depend on previously published root hash value. Other embodiments can easily be understood from the formulas presented earlier on.

Figure 8:
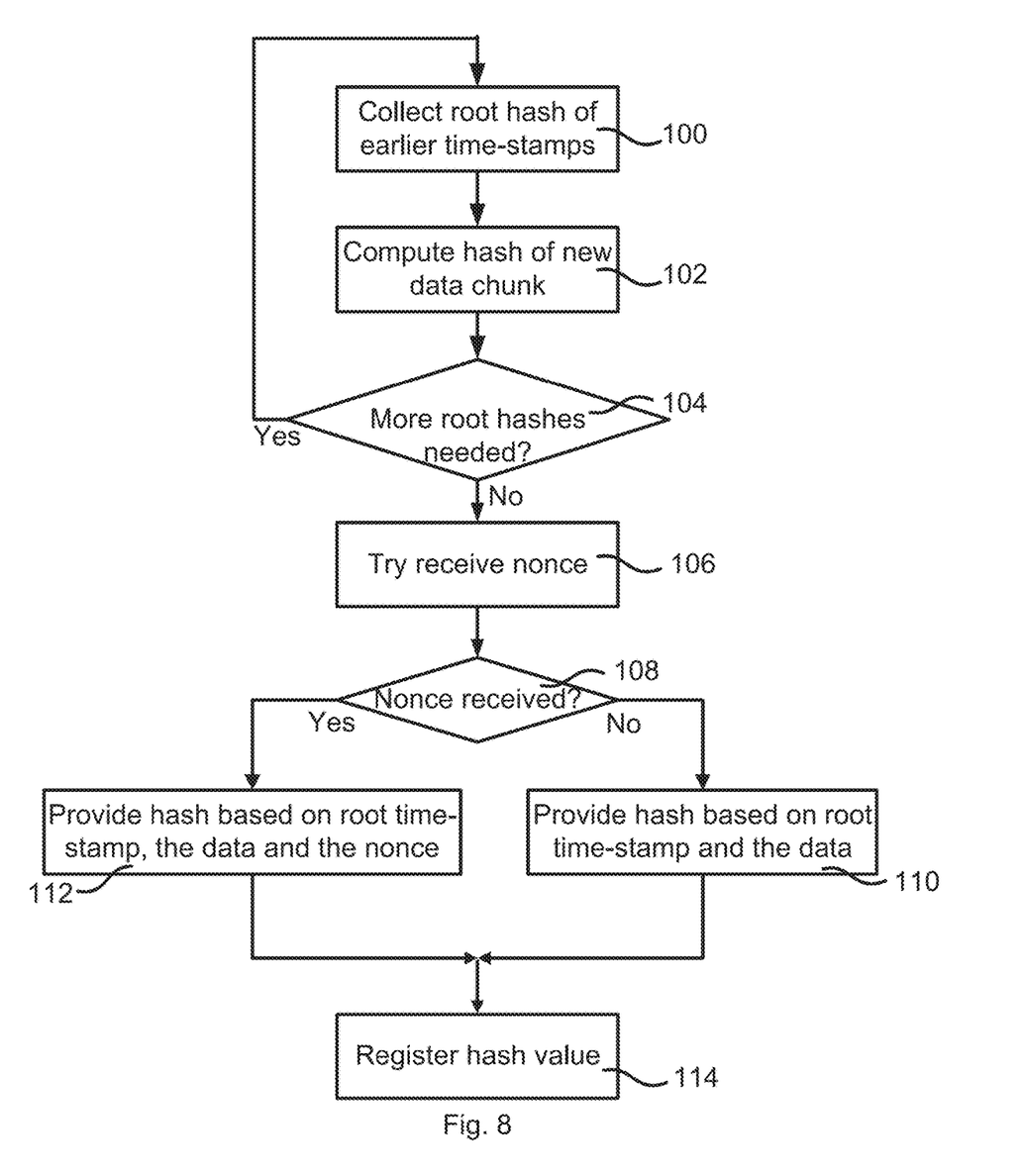
FIG. 8 is a flow chart illustrating a method according to an embodiment.

FIG. 8 is a flow chart schematically illustrating methods according to embodiments. The methods provide a hash value for a piece of data. The hash value provides for a time-stamp for the piece of data upon verification. The benefit of the methods is to limit a risk of collisions between hash values, in particular an intentional collision for tampering the time stamp. The method comprises collecting one or more root time-stamps for a root of a hash tree structure defining a hash function. The root-time stamp is a root time-stamp from the past. The method may thus include collecting 100 a root hash of an earlier time-stamp and compute 102 a hash of the piece of data. It may be determined 104 whether more root hashes of earlier time-stamps are needed, e.g. according to a predetermined rule or policy. If further root hashes are needed (YES), the steps 100-104 are repeated with the further root hash. If no further root hashes are needed (NO), a nonce is tried to be received 106 from a server. The method further comprises determining 108 whether a nonce may be received from the server. Upon failure to receive the nonce from the server, the method provides 110 the hash value by a hash function of the root time-stamp and the piece of data. Upon success in receiving the nonce from the server, the method provides 112 the hash value by the hash function of the root time-stamp, the piece of data and the nonce. The root time-stamp may be a calendar root hash. The hash function may be a cryptographic message authentication code function. The cryptographic message authentication code function may be a keyed-hash cryptographic message authentication code function. The keyed-hash cryptographic message authentication code function may use the nonce as a key upon success in receiving the nonce from the server. The keyed-hash cryptographic message authentication code function may use the root time-stamp as a key. A combination of these is also feasible. The root time-stamp from the past may comprises one or more root hash values. The oldest one of the root hash values may be selected to emanate from a root hash that is issued at most a time T before the provision of the hash value for the piece of data. The time T may depend on the size of the piece of data such that a smaller amount of data is given less time back than a larger amount of data. These constraints may provide for avoiding intentional collision for tampering the time-stamp. The method may comprise registering 114 the provided hash value.

Figure 9:
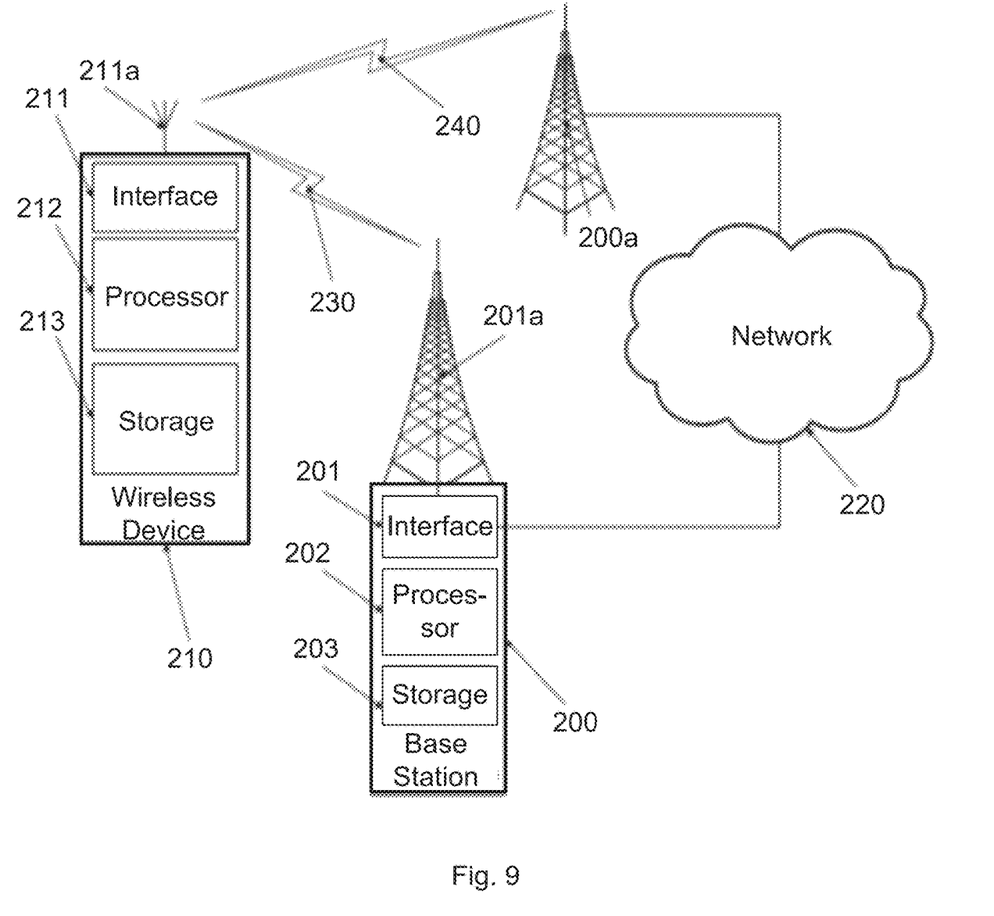
FIG. 9 schematically illustrates a wireless network with network nodes and a wireless device in which the invention may be implemented according to an embodiment.

FIG. 9 illustrates a wireless network comprising a more detailed view of network node 200 and wireless device (WD) 210, in accordance with a particular embodiment. For simplicity, FIG. 2 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network and allowing for a change in estimated DL CC. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more of IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 200 comprises processor 202, storage 203, interface 201, and antenna 201a. These components are depicted as single boxes located within a single larger box. In practice however, a network node may comprises multiple different physical components that make up a single illustrated component (e.g., interface 201 may comprise terminals for coupling wires for a wired connection and a radio transceiver for a wireless connection). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless devices, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signaling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

In some embodiments, the components described above may be used to implement one or more functional modules used in a collision-blocking method for hash tree based time stamping. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any features or functions disclosed herein. The modules may further be configured to perform other functions or steps not explicitly described herein but which would be within the knowledge of a person skilled in the art.

Figure 10:
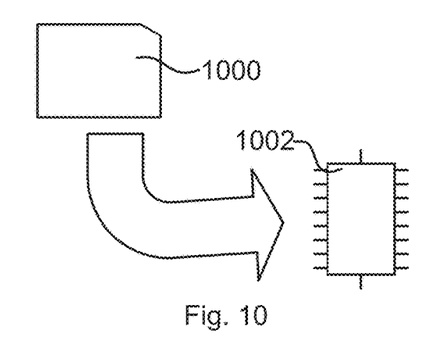
FIG. 10 schematically illustrates a computer-readable medium and a processing device.

The methods according to the present invention is suitable for implementation with aid of processing means, such as computers and/or processors, especially for the case where the processing element 202, 212 demonstrated above comprises a processor handling security functions. Therefore, there is provided computer programs, comprising instructions arranged to cause the processing means, processor, or computer to perform the steps of any of the methods according to any of the embodiments described with reference to FIG. 8. The computer programs preferably comprises program code which is stored on a computer readable medium 1000, as illustrated in FIG. 10, which can be loaded and executed by a processing means, processor, or computer 1002 to cause it to perform the methods, respectively, according to embodiments of the present invention, preferably as any of the embodiments described with reference to FIG. 8. The computer 1002 and computer program product 1000 can be arranged to execute the program code sequentially where actions of the any of the methods are performed stepwise. The processing means, processor, or computer 1002 is preferably what normally is referred to as an embedded system. Thus, the depicted computer readable medium 1000 and computer 1002 in FIG. 10 should be construed to be for illustrative purposes only to provide understanding of the principle, and not to be construed as any direct illustration of the elements.

The invention claimed is:

1. A method of providing a hash value for a piece of data, where the hash value provides for a time-stamp for the piece of data upon verification, for limiting a risk of collisions between hash values, the method comprising:

collecting one or more root time-stamps for a root of a hash tree structure using a function of the root time-stamp that is one of a hash function and a cryptographic message authentication code function, wherein the root time-stamp is a root time-stamp from the past;

determining whether a nonce has been received from a server; and upon failure to receive the nonce from the server, providing the hash value by the function of the root time-stamp and the piece of data, or upon success in receiving the nonce from the server, providing the hash value by the function of the root time-stamp, the piece of data and the nonce, wherein:
the root time-stamp from the past comprises one or more root hash values and the oldest one of the root hash values emanates from a root hash that is issued no earlier than an amount of time T before a time of the provision of the hash value for the piece of data, and the amount of time T is proportional to a size of the piece of data.

2. The method of claim 1, wherein the root time-stamp is a calendar root hash.

3. The method of claim 1, wherein the hash function is a cryptographic message authentication code function.

4. The method of claim 3, wherein the cryptographic message authentication code function is a keyed-hash cryptographic message authentication code function using at least one of the nonce, upon success in receiving the nonce from the server, and the root time-stamp as a key.

5. The method of claim 1, comprising registering the provided hash value.

6. An electronic device comprising:
a processor; and
a storage,
wherein the electronic device is configured to perform a method of providing a hash value for a piece of data, where the hash value provides for a time-stamp for the piece of data upon verification, for limiting the risk of collisions between hash values, the method comprising:

collecting one or more root time-stamps for a root of a hash tree structure using a function of the root time-stamp that is one of a hash function and a cryptographic message authentication code function, wherein the root time-stamp is a root time-stamp from the past;

determining whether a nonce has been received from a server; and upon failure to receive the nonce from the server, providing the hash value by the function of the root time-stamp and the piece of data, or upon success in receiving the nonce from the server, providing the hash value by the function of the root time-stamp, the piece of data and the nonce, wherein:
the root time-stamp from the past comprises one or more root hash values and the oldest one of the root hash values emanates from a root hash that is issued no earlier than an amount of time T before a time of the provision of the hash value for the piece of data, and the amount of time T is proportional to a size of the piece of data.

7. The electronic device of claim 6, being a wireless device.

8. The electronic device of claim 6, being a network node.

9. A nontransitory computer readable storage medium comprising a computer program comprising instructions which, when executed on a processor of an electronic device, causes the electronic device to perform a method of providing a hash value for a piece of data, where the hash value provides for a time-stamp for the piece of data upon verification, for limiting the risk of collisions between hash values, the method comprising:

collecting one or more root time-stamps for a root of a hash tree structure using a function of the root time-stamp that is one of a hash function and a cryptographic message authentication code function, wherein the root time-stamp is a root time-stamp from the past;

determining whether a nonce has been received from a server; and upon failure to receive the nonce from the server, providing the hash value by the function of the root time-stamp and the piece of data, or upon success in receiving the nonce from the server, providing the hash value by the function of the root time-stamp, the piece of data and the nonce, wherein:
the root time-stamp from the past comprises one or more root hash values and the oldest one of the root hash values emanates from a root hash that is issued no earlier than an amount of time T before a time of the provision of the hash value for the piece of data, and the amount of time T is proportional to a size of the piece of data.

* * * * *